US008793698B1

(12) United States Patent
Sandstrom (10) Patent No.: US 8,793,698 B1
(45) Date of Patent: Jul. 29, 2014

(54) LOAD BALANCER FOR PARALLEL PROCESSORS

(71) Applicant: Mark Henrik Sandstrom, Jersey City, NJ (US)

(72) Inventor: Mark Henrik Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 0 days.

(21) Appl. No.: 13/901,566

(22) Filed: May 24, 2013

Related U.S. Application Data (60) Provisional application No. 61/767,760, filed on Feb. 21, 2013.

(51) Int. Cl.
*G06F 9/46* (2006.01)
*G06F 15/173* (2006.01)
*H04L 29/08* (2006.01)
*G06F 9/50* (2006.01)

(52) U.S. Cl.
CPC ........ *G06F 9/505* (2013.01); *G06F 2206/1012* (2013.01); *H04L 67/1038* (2013.01)
USPC ............................. 718/105; 718/104; 709/226

(58) Field of Classification Search
CPC ............................. G06F 9/505; H04L 67/1038
USPC ................................... 718/105, 104; 709/226
See application file for complete search history.

(56) References Cited

U.S. PATENT DOCUMENTS

| 2002/0040400 | A1* | 4/2002 | Masters ........................ 709/228 |
| 2002/0169828 | A1* | 11/2002 | Blanchard .................... 709/203 |
| 2003/0018807 | A1 | 1/2003 | Larsson et al. |
| 2004/0158637 | A1 | 8/2004 | Lee |
| 2010/0100883 | A1 | 4/2010 | Booton |
| 2012/0303809 | A1* | 11/2012 | Patel et al. .................... 709/225 |

FOREIGN PATENT DOCUMENTS

GB 2272311 A 5/1994

* cited by examiner

*Primary Examiner* — Camquy Truong (57) ABSTRACT

Invented systems and methods provide a scalable architecture and hardware logic algorithms for intelligent, realtime load balancing of incoming processing work load among instances of a number of application programs hosted on parallel arrays of manycore processors, which can be dynamically shared among the hosted applications according to incoming processing data load variations for each of the application instances as well as the processing capacity entitlements of the individual applications.

19 Claims, 2 Drawing Sheets

LOAD BALANCER FOR PARALLEL PROCESSORS

CROSS-REFERENCE TO RELATED APPLICATIONS

This application claims the benefit of the following application, which is incorporated by reference in its entirety:
[1] U.S. Provisional Application No. 61/767,760, filed Feb. 21, 2013.

This application is also related to the following, each of which is incorporated by reference in its entirety:
[2] U.S. Utility application Ser. No. 13/184,028, filed Jul. 15, 2011;
[3] U.S. Utility application Ser. No. 13/270,194, filed Oct. 10, 2011;
[4] U.S. Utility application Ser. No. 13/277,739, filed Nov. 21, 2011;
[5] U.S. Provisional Application No. 61/657,708, filed Jun. 8, 2012;
[6] U.S. Provisional Application No. 61/673,725, filed Jul. 19, 2012;
[7] U.S. Provisional Application No. 61/721,686, filed Nov. 2, 2012;
[8] U.S. Utility application Ser. No. 13/684,473, filed Nov. 23, 2012;
[9] U.S. Provisional Application No. 61/764,521, filed Feb. 13, 2013;
[10] U.S. Provisional Application No. 61/804,660, filed Mar. 23, 2013; and
[11] U.S. Provisional Application No. 61/823,368, filed May 14, 2013.

BACKGROUND

1. Technical Field

This invention pertains to the field of information processing and communications, in particular to load balancing of incoming information processing work load among instances of application programs hosted on arrays of parallel processor based server computers.

2. Descriptions of the Related Art

Conventional server load balancing systems are implemented by software programs running on microprocessors. However, since a load balancing process is control process, its responsiveness to changes, e.g., in terms of ability to monitor application processing load status and processing resource availability and to actuate the control decisions based on the monitoring, needs to be at least as fast as what can be the rate of potential changes in the underlying load variations and resource availability. A conventional software based load balancers, due to the non-deterministic latency of their control decision cycles, however will, in particular under bursty load conditions, unavoidably, and unpredictably, lag behind the actual, networking and processing hardware level changes in the incoming application processing load levels and processing resource status. This leads to suboptimal control decisions, e.g. via load balancing decisions that, when actuated, are not the optimal decisions for the actually prevailing hardware level circumstances.

Innovations are thus needed to enable load balancers with the ability to handle in realtime, with minimal and deterministic decision cycle latencies, high volumes of load balancing decisions.

SUMMARY

An aspect of the invention provides hardware logic system for intelligently directing incoming processing data units, with such units referred to as packets, to instances of a set of locally hosted application programs referred to as the applications. Such a system includes: (I) at any given one of a set of processing systems, each of which hosts its assigned groups of instances of the applications, a hardware logic subsystem for producing, for each given one of the applications, an expression of availability of instances hosted at the given processing system that are accepting packets with no destination instance specified, with such packets referred to as no-instance-specified (NIS) packets; and (II) at an inter-processing-system load balancer among a set of such load balancers, a hardware logic subsystem for: examining whether an incoming packet destined for a given one of the applications has a destination instance of that given application identified, and if so, directing the packet toward a processing system that hosts such an identified destination instance, while otherwise, selecting an appropriate processing system to which to forward the packet, at least in part based on the expressions of availability of instances of the given application for NIS packets from individual processing systems of said set, and directing the packet to a such selected processing system.

Various embodiments of a system per above include various combinations of further features, including features whereby: (a) the expressions of availability of instances for the given application are based at least in part on one or more of the following numbers per each given one of the processing systems: 1) a number of available instances of the destination application for a given NIS packet hosted on the given processing system, referred to as an X number, and 2) a sum of available instances, within an entitlement quota of concurrently executing instances of each given application among the set, across the set of applications hosted on the given processing system, referred to as an Y number; (b) among a group of the processing systems tied for the greatest X number, the hardware logic subsystem at the load balancer selects the processing system that has a greatest Y number as the processing system to which to direct the given NIS packet; (c) among a group of the processing systems tied for a greatest Y number, the hardware logic subsystem at the load balancer selects the processing system that has a greatest X number as the processing system to which to direct the given NIS packet; (d) the hardware logic subsystem at the load balancer forwards a given incoming NIS packet to such a processing system, among said set, that has a highest weighted sum of its number X and number Y, wherein each of the numbers X and Y for said weighted sum have their independently set positive values of their weighting coefficients; and/or (e) each of the processing systems among said set is numbered with its unique, incrementing identification number (ID), each of the load balancers among said set is configured with its own starting ID value for the processing systems so as to have such starting ID values by the set of load balancers fall evenly among the set of processing systems, and in cases of an equality among at least one of the numbers X, Y, or a weighted sum of X and Y by a group of the processing systems, the hardware logic subsystem at each given load balancer among the set selects the processing system with its ID number closest to the starting ID value configured for the given load balancer, with such closeness measured as a number of increments of the ID number needed from said starting ID value to reach an ID number of a given candidate processing system, such that when incrementing the ID number, upon reaching a maximum of such ID numbers, the incrementing continues from 0.

Moreover, an embodiment of this system further comprises, at each given one of the set of processing systems, a hardware logic subsystem for producing, for each given one of the applications, an indication of which instances of the given application are accepting NIS packets, and at a second-stage load balancer specific to a processing system to which the packet was directed to by the inter-processing-system load balancer, a hardware logic subsystem for: examining whether the packet is a NIS packet, and if so, determining an appropriate instance of said destination application among the group of instances of that application hosted on the processing system, at least in part based on said indication of which instances of said destination application are accepting NIS packets, and directing the packet toward a processing resource associated with such determined instance of that application, while otherwise, directing the packet toward a processing resource associated with the destination instance already identified for the packet.

Furthermore, in an embodiment of this system, (a) a processing system of said set has multiple input ports, with an array of multiplexers comprising, for each such input port, a multiplexer multiplexing packets from a group of buffers storing input packets forwarded to the processing system through a group of output ports of the set of inter-processing-system load balancers, (b) each given multiplexer of the array enters into a trial-on mode of selecting its next one of the buffers to read a new packet from upon reaching the end of a packet it transfers to the processing system via the input port of the processing system associated with the given multiplexer, (c) each of the ports, multiplexers and buffers are identified with their unique IDs numbered from 0 upwards within their respective sets, and, (d) in case there are, at a given time: (i) H high-fill-available buffers in the group, such that are not being read at the given time, that have one or more packets available for reading and that have their fill levels at or above a monitoring threshold configured for these buffers; (ii) L low-fill-available buffers in the group, such that are not being read at the given time, that have one or more packets available for reading and that have their fill levels below a monitoring threshold configured for these buffers; and (iii) K lower ID multiplexers in the trial-on mode than a given multiplexer of the array, wherein K, L and H are non-negative numbers, the buffer from said group for that given multiplexer to read its next packet from is: if K is less than H, the high-fill-available buffer, for which the count of high-fill-available buffers with lower ID than that buffer equals K; and else, the high-fill-available or low-fill-available buffer for which the count of low-fill-available buffers with lower ID than that buffer equals K minus H.

Another aspect of the invention provides hardware logic implemented method for intelligently directing incoming processing data packets, to instances of a set of locally hosted applications. Such a method involves (I) at any given one of a set of processing systems, each of which hosts its assigned groups of instances of the applications, producing, for each given one of the applications, an expression of availability of instances hosted at the given processing system that are accepting packets with no destination instance specified; and (II) by an inter-processing-system load balancer among a set of such load balancers, in case an incoming NIS packet, selecting an appropriate processing system to which to direct the packet, at least in part based on the expressions of availability of instances of the given application for NIS packets from individual processing systems of said set.

An additional aspect of the invention provides a hardware logic system for directing incoming processing data packets, to instances of a locally hosted application program referred to as the application. Such a system includes: (I) at any given one of a set of processing systems, each of which hosts its assigned group of instances of the application, a hardware logic subsystem for producing an expression of which instances among said group are accepting NIS packets, with such instances accepting NIS packets referred to as available instances; and (II) at a processing system specific load balancer of a processing system to which the packet was directed to by an inter-processing-system load balancer, a hardware logic subsystem for: examining whether the packet is a NIS packet, and if so, selecting an appropriate instance among the group of instances of the application hosted on the processing system, at least in part based on said expression of which instances among said group are accepting NIS packets, and directing the packet toward a processing resource associated with such selected instance of the application, while otherwise, directing the packet toward a processing resource associated with the destination instance previously identified for the packet.

An embodiment of the above system further includes: at any given one of the set of processing systems, hardware logic for expressing a number of the available instances at the given processing system, and at the inter-processing-system load balancer, hardware logic for: examining whether an incoming packet destined for the application is a NIS packet, and if so, determining an appropriate processing system to which to forward the packet, at least in part based on said numbers of the available instances from individual processing systems of said set, and directing the packet to a such determined processing system, while otherwise, directing the packet toward a processing system that hosts such identified destination instance.

A further aspect of the invention provides a hardware logic implemented method for intelligently directing incoming processing data packets, to instances of a locally hosted application. Such a method involves: (I) at any given one of a set of processing systems, each of which hosts its assigned group of instances of the application, producing an expression of which instances among said group are accepting NIS packets, with such instances accepting NIS packets referred to as available instances; and (II) at a processing system specific load balancer of a processing system of said set, in case of an incoming NIS packet, selecting an appropriate instance among the group of instances of the application hosted on the processing system to which to direct the packet, at least in part based on said expression of which instances among said group are accepting NIS packets.

A yet another aspect of the invention provides a hardware logic implemented method for intelligently directing incoming processing packets, to a set of locally hosted destination application program instances, with such a method involving steps of: examining whether an incoming packet has a destination application instance identified, and if the packet has a destination application instance identified for it, directing the packet to a processing resource associated with its identified destination application instance, and otherwise, checking if any instances of the destination application exist at that time such that are indicated as accepting packets with no destination instance specified, and if so, directing the packet to one of such instances. In an embodiment of this method, the step of checking involves monitoring one or more hardware signals that indicate whether any given one of the locally hosted destination application program instances is presently accepting packets with no destination instance specified, with such signals produced at least in part based on values that each of the locally hosted destination application program instances have configured for their associated hardware device registers provided to maintain a status of whether its associated locally hosted destination application program instance is accepting packets with no destination instance specified.

DETAILED DESCRIPTION

Embodiments and aspects of the invention are described in the following with references to FIGS. General symbols and notations used in FIGS. include:

Boxes indicate a functional digital hardware logic module.

Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.

Figure 1:
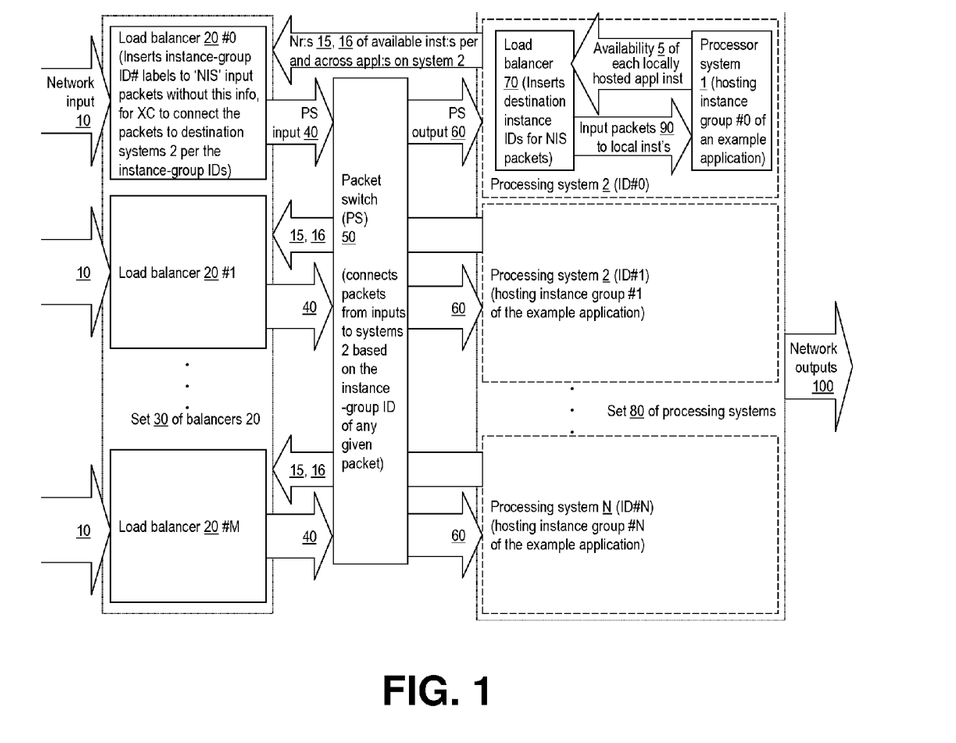
FIG. 1 shows, in accordance with an embodiment of the invention, a functional block diagram for load balancing architecture for dynamically optimizing distribution of incoming processing work load units among a set of application program instances hosted on a parallel array of manycore processor based server computers.

A dotted line marks a border of a group of drawn elements that form a logical entity with internal hierarchy, such as the modules 20 constituting the set 30 in FIG. 1. An arrow reaching to such border of a set of modules indicate connectivity of the associated information to/from all internal modules of the set.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

Embodiments and aspects of the invention provides systems and methods for dynamically optimizing distribution of incoming processing data packets to instances of a set of hosted applications, according to packet-by-packet application processing load variations and processing hardware resource availability. Such systems and methods involve: 1) at each of a set of processing systems hosting their assigned groups of instances of the applications, producing expressions of (i) which instances of the applications are available for no instance specified (NIS) packets, and (ii) a number of the available instances for NIS packets per each of the applications at the given processing system; 2) by a first-stage load balancer, in case an incoming packet is a NIS packet, selecting an appropriate processing system to which to forward the packet, at least in part based on said expressions (ii) from individual processing systems of said set for the destination application of the NIS packet, and directing the packet to a such selected processing system, while otherwise, directing the packet toward processing system that hosts its identified destination application instance; and 3) at a second-stage load balancer specific to a processing system to which the packet was directed to by the first-stage load balancer, in case the packet is a NIS packet, determining an appropriate instance among instances of its destination application hosted on the processing system, at least in part based on said expression (i) for that application, and directing the packet toward a processing resource associated with such determined instance of that application, while otherwise, directing the packet toward a processing resource associated with such identified destination instance. In various embodiments of the invention, said processing resource can be a digital data buffer or a piece of data processing logic such as a processing core, which, in turn, can be a central processing unit, a graphics processing unit, a digital signal processor, or an application specific processor or equal.

FIG. 1 provides, according to an embodiment of the invention, a functional block diagram for a hardware logic system connecting a stream of incoming processing data units, referred to as packets, for processing by instances of their indicated destination applications programs, with a capability to determine an optimal processing instance for such incoming packets that did not have their destination instances of their destination application identified at arrival to the system.

The system per FIG. 1 operates, in an illustrative scenario, as follows:

An illustrative operating context for the invention per FIG. 1 comprises a set processors (e.g. manycore central processing units) for hosting a set of application programs instances at each, with such applications performing their data processing functions at least in part in response to incoming packets directed to the individual applications hosted on the system, wherein such data processing functions of a given application include producing output packets, via the network outputs 100, directed to external parties such as the parties originating the input packets for the given application. While the resources per FIG. 1, in at least some operating scenarios, can be dynamically shared among a number of application programs, the discussion herein focuses, for clarity of description, primarily on the operation of embodiments of the invention concerning just one of such applications, referred to as "the (given/example/destination) application". Note that terms software program, application program, application and program are used interchangeably in this specification, and each generally refer to any type of executable computer program or segment thereof.

Any given processor system 1 in the operating context per FIG. 1 is able to host several instances of the given example application program. A set of instances of the application hosted on a given processing system 2 are referred to as an instance group. There is an identification number (ID) for each processing system 2 reachable by a given packet-switch (PS) 50, and similarly, the instance groups hosted on each given processor 2 have their instance group IDs. For simplicity of the description, we assume that the former two IDs are equal for our example application, though this is not necessarily a rule for applications and processors 2 in general.

The input packets from the external network ports 10 may however specify just the destination application of a given packet, but not necessarily any instance of that application. This may occur for instance at a start of certain connected proceedings (referred to as 'session') between the sender (e.g. a particular client) of the given input packet and the application (server) hosted the set of processors 80. In such situations, a inter-processing-system load balancer 20, upon receiving a packet destined to an application hosted on the processing systems 80, selects a suitable processing system 2 to forward the packet to, and attaches for the packet (or specifies the value for a previously blank) label identifying its instance group corresponding to the processing system that the packet got forwarded to. According to herein studied embodiments of the invention, the balancers 20 use information 15, 16 from the systems 2 regarding the present availability of instances of the applications hosted at them for processing such non-instance-specified (NIS) packets, to determine a suitable system 2 among the set 80 to forward to any given NIS packet received from the network inputs 10. In case the set 80 did not have any system 2 with an available instance for a NIS packet, the balancer may act so as to produce an application unavailable message to the originator of such NIS packet. Note that some of the incoming packets naturally can have their destination application instances (including the instance group as part of the identification of the destination instance) identified already as received by the balancer 20. The PS 50 connects the packets from its inputs 40 to its outputs 60 as directed by the instance group ID label of each packet identifying its destination processing system 2. Again, for our discussion herein, we assume that the ID of the destination processing system 2 is the same as the destination instance group ID for the incoming packets under study.

At a processor-specific load balancer 70, in case of receiving a NIS packet via its XC output port 60, i.e. a packet that did not have its destination instance identified, the balancer 70 determines a suitable instance of the destination application of the packet within its local manycore processor system 1. According to herein studied embodiments of the invention, each given balancer 70 uses information 5 from its local manycore processor 1 regarding the availability at it of instances (of the herein studied destination application) for processing NIS packets, to determine a suitable instance of the destination application to forward such NIS packets to. According to such determination, the balancer 70 labels the NIS packets it receives with an identifier of its assigned processing instance of its destination application. The processor system 1 connects the packets it receives 90 from its load balancer 70 to application-instance specific buffers, at least in part based on the destination instance label of each given packet, which labels, as discussed above, are determined and inserted for the packets by the load balancers 20 and 70 in case the packets did not have this information as they were received for the discussed load balancing system from the network inputs 10. In at least some embodiments, the destination application instance (group) labels for each packet on interfaces 40, 60 and 90 are provided via overhead bits accompanying each packet. Such destination application instance (group) specifying overhead bits are, in at least some embodiments, provided via parallel bits accompanying the packet data bits, while in an alternative embodiment, these overhead bits are written to appropriate header fields of the packets.

Determining an optimal suitable destination instance group or instance for an incoming NIS packet by the load balancers 20 and 70, as outlined above and illustrated in FIG. 1, is done, at least in some embodiments of the invention, at least in part based on availability 15, 5 of instances at individual processor systems 2 reachable by a given PS 50 for processing NIS packets of the herein studied destination application. In certain embodiments, the application software instances indicate themselves as available for accepting NIS packets once they have concluded an earlier processing session with a former client, as well as if such a session got terminated for some reason, e.g. failed authentication or lack or authority by a given client for a given transaction, session time out due to lack of activity from the client, etc. In these embodiments, upon such session conclusion or termination, the instance software configures a hardware device register, in an embodiment within its local processing system 2, to a value indicating itself as available for incoming NIS packets. Similarly, in certain embodiments, the instance software configures such a device register to a value indicating itself as unavailable for incoming NIS packets once it has received 90 (through the load balancers 20 and 70 determining an appropriate destination instance of an indicated application for incoming 10 NIS packets) a packet directed for processing by it. In an alternative embodiment, the hardware logic of the processing system 2, e.g. the load balancer 70, once detecting or causing an event of a given application instance (that had been available for NIS packets) getting forwarded 90 a packet directed to it, automatically reconfigures said device register to a value indicating the instance in question as unavailable for new NIS packets. After power on reset of a given processing system 2 and at alike system startup situations, these device registers are set to values indicating each application instances as available for processing NIS packets. The info 5 from said device registers regarding availability of any given application instance hosted at a given processing system 2 is provided via hardware for the load balancer 70. Furthermore, hardware logic at a given processing systems 2 sums up the numbers of available instances (for NIS packets) for each given locally hosted application, as well as across all the locally hosted applications within each given application's entitlement for concurrently executing instances, and signals via hardware these numbers (i.e., the number 15 of available instances per each application, and total number 16 of available instances, within an entitlement for each given application for concurrently executing instances, across all the applications on the given processor 2) for the set 30 of the load balancers 20 of the load balancing system per FIG. 1.

Note that, according to at least some embodiments of the invention, a processing system 2, while configured to support a certain maximum number of instances for each given application hosted on it, is also configured with a contractual entitlement quota for concurrently executing instances per each such locally hosted application. In at least some embodiments, this contractual entitlement is what is referred to in [4] as Core Entitlement (CE). Naturally, this quota can be set to any desired value between 0 and the maximum supported number of instances of the given application. As an example, if a processing system 2 supports 64 instances of an application, while the application has a contractual entitlement for up to 24 instances, and that application presently has 6 executing instances on that processing system, the contribution from that application for the total number 16 of the given processing system is 24−6=18 in-quota available instances. The Total of such In-Quota Instance availability contributions from all the applications hosted on a given system 2 is from here on referred to as the TIQI number of the given processing system.

The use of the info 5, 15 and 16 (expressing availability of application instances for processing NIS packets) by the load balancers 20 and 70 in determining an optimal destination instance within an indicated application, according to at least some embodiments of invention, is detailed in the following.

A load balancer 20 directs incoming 10 NIS packets among a number of destination application instance groups (with each such group fronted by a load balancer 70 per FIG. 1) at least in part based on indications 15 of whether or to what degree a given instance group fronted by its load balancer 70 is presently accepting NIS packets for any given application, i.e., how many, if any, instances of the given destination application hosted at the processor 1 served by a given load balancer 70 there are available for processing NIS packets.

Figure 2:
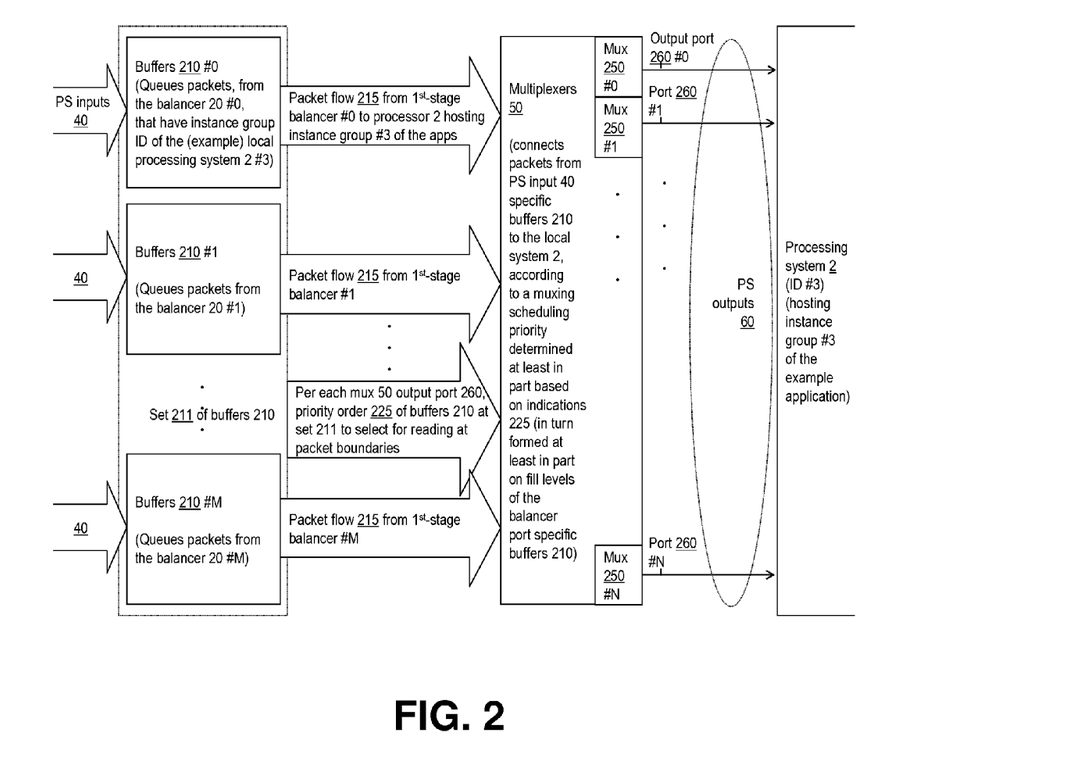
FIG. 2 shows, in accordance with an embodiment of the invention, aspects of the internal architecture of a packet switch (PS) for interconnecting the first-stage (inter-processing-system) and the second-stage (processing-system-specific) load balancers as shown in FIG. 1, by illustrating a subsystem for multiplexing input packets from the first-stage balancers to an example manycore processor among the array of such processors. Note that similarly to the outputs from the PS to any of the manycore processors of the array (as is drawn in FIG. 2), also the inputs from any first-stage load balancer to the PS can comprise a multiple ports.

In at least some embodiments, there is a set 30 of several load balancers 20 per FIG. 2 as well as a set 80 of number of balancers 70 per FIG. 1, interconnected by a packet-switch (PS) 50, together connecting the collective inflow of input packets from network input ports 10 to the processors 1 fronted by the load balancers 70, based at least in part on indications of destination application instance, if any, identified by any given input data packet, as well as, in cases of NIS (i.e. no destination instance specified) packets, indications 15 of whether at the processor served by any given load balancer 70 there are one or more available instances of the destination application (i.e. instances that at the time are accepting incoming NIS packets) and indications 5 expressing which instances of the destination application of concern hosted at the determined processing system 2 are available.

According to embodiments of the invention, the indications 15 from any given processing system 2 express the number of instances of each given application at the given system 2 that are accepting NIS packets. In at least some of such embodiments, a load balancer 20, in deciding to which processing system 2 to direct a given incoming NIS packet, prioritizes the systems 2 for selection as the processing system to which to direct the given NIS packet according to a descending magnitude of their expressions 15 for the destination application of the NIS packet; i.e., the load balancer directs a NIS packet to such a processing instance 2 which at that time has the greatest number of available instances of the destination application of the packet, assuming there are any systems 2 with such available instances.

Moreover, in some embodiments of the invention, for the set 30 of balancers 20 to distribute their collective incoming processing workload evenly among the processing systems 2, the individual systems 2 among the set 80 are numbered with their unique, incrementing ID numbers, and each balancer 20 among the set 30 is configured with its own, e.g. linearly incrementing, starting system 2 ID value. In such embodiments, among a group of systems 2 (among the set 80) tied at a given time for the greatest number 15 of their available instances of the given destination application, each balancer 20 among the set 30 selects the system 2 to which to direct a NIS packet destined for that application by scanning (linearly increasing the system 2 ID# among said group and revolving to 0 from the top ID#) such systems 2 (with equal number of available instances) starting from the system 2 ID# configured for the given balancer 20 as its start-ID#.

Furthermore, according to at least some embodiments of the invention, there are a number of different applications hosted at the systems 2 within the set 80. In such embodiments, a balancer 20 among the set 30, in deciding to which system 2 to direct a given NIS packet, besides the number 15 of available instances of the destination application for the given NIS packet, considers also the TIQI number 16 (i.e. the total of available instances, within the applications' respective entitlement quotas for their concurrently executing instances, across all the locally hosted applications) of each system 2. For instance, among a group of systems 2 tied for the greatest number of available instances of the destination application of a given NIS packet, in such an embodiment, a balancer 20 selects the system 2 that has the greatest total in-quota instance availability (TIQI) 16 across all its locally hosted applications as the system 2 to which to direct the NIS packet. Alternatively, among a group of systems 2 tied for the greatest TIQI number 16, a balancer 20 selects the system 2 that has the greatest total number of available instances of the destination application of a given NIS packet as the system 2 to which to direct the NIS packet. And in cases when there are systems 2 tied both for the greatest number 15 of available instances of the destination application as well as for the TIQI number 16, a given load balancer 20 selects the system for directing the incoming NIS packet by scanning (as previously described) such double-tied systems 2 among the set 80 starting from the system 2 ID# configured for the given balancer 20 as its start-ID#.

In certain embodiments yet, a load balancer 20 prioritized systems 2 for its selection as to where to forward a given incoming NIS packet according to what are referred to herein as preference indices of the individual processing systems 2. Such preference indices, for any given system 2 is given by a weighted sum of i) the number 15 of available instances of the destination application for a given NIS packet at that given system 2 (with this number represented by X) and ii) the total number 16 of in-quota available instances (TIQI) across all the applications hosted at that system 2 (with this number represented by Y). An example of such a weighted sum based preference index for a system 2 is: $2X+Y$. Various embodiments can naturally have the weighting coefficients for the terms X and Y set to any other values as well. Yet in further embodiments, these weighted sums can include more inputs than the discussed numbers X and Y. For instance, the term X can be broken to two parts: a subterm $X_1$ for a number of available instances of the destination application of a NIS packet within that application's quota of entitled concurrently executing instances, and another subterm $X_2$ for a number of available instances of that application beyond that application's quota of entitled concurrently executing instances. As an example, at a processing system 2, the given application could be contractually entitled for up to ten concurrently executing instances, while the processing system supports up to 64 instances of the application altogether. In such a case, if the application presently had 4 executing instances, its subterm $X_1$ will be (its contractual entitlement) 10 less (its executing instances) 4 i.e. 6, while its subterm $X_2$ will be (its number of supported instances beyond that application's quota) 54 less (its executing instances beyond its entitlement) 0 i.e. 54. As another example, with same conditions other than that the number of executing instances of the application being 14, the application's subterm $X_1$ will be 0 (no available instances within the application's contractual entitlement), while its subterm $X_2$ will be (its number of supported instances beyond its entitlement) 54 less (its executing instances beyond its entitlement) 14 i.e. 40. For such a first-stage (i.e. inter-processing-system) load balancing algorithm, the weighted sum formula for preferability index of the processing systems for a processing-system-specific balancer 70 to direct a NIS packet will be of form $aX_1+bX_2+cY$, where the coefficients a, b and c can be set to the desired values for a given system, e.g. $4X_1+X_2+2Y$. As a specific full example for ranking the relative NIS packet forwarding preferability of given two alternative systems 2 with the previous weighting sum formula, let's consider two systems 2:

Processing system P, with its $X_1$ (available instances of the destination application within its entitlement) at 0, $X_2$ (available instances of the of the destination application beyond its entitlement) at 10, and Y (total number of available in-quota instances across all the applications) at 12: the preferability index is $4*0+10+2*12=34$.

Processing system Q, with its $X_1$ at 4, $X_2$ at 12, and Y at 4: the preferability index is $4*4+12+2*4=36$.

Among the systems P and Q, the processing system Q is thus at the time of the above values more preferable for forwarding a NIS packet (destined for the application for which $X_1$ and $X_2$ where counted for). Finally, similarly as in previously described types of load balancing algorithms, in case of systems 2 tied for the greatest value of such preference index, each given load balancer 20 prioritizes such tied systems 2 for selection as the one to forward a given NIS packet according to the (rolling over to 0) proximity of their system ID#s from the starting ID# configured for any given balancer 20.

Detail specifications for particular logic implementations of the above described functionality are provided in the following, with references to FIG. 2.

In the herein studied embodiment, a PS input 40 comprises multiple ports the same way as the drawn output PS 60 can comprise multiple ports 260 (each of which is served by its port 260 specific multiplexer 250). At each of the PS input 40 specific group of buffers 210, there is a packet FIFOs (First-In First-Out buffers, noting that also other types of buffers can be used in various embodiments) for each such port within a PS input 40 (connecting packets from an output port given balancer 20). All these ports, multiplexers 250 and FIFOs are given their linearly incrementing (from 0) ID#s. In various embodiments of the invention, these ID#s can be given in any arbitrary order or manner for these ports, multiplexers and buffers, so long as the ID for any given element (port, mux, buffer) provides a unique identifier of the given element in its associated set. We now define certain terms:

H, L, K: non-negative integers.

trial_on: a digital status of the multiplexer 250 indicating (when in active state) that it is ready to begin reading a new packet, but the selection of the FIFO (from the set 211) has not yet been done.

hi_fill_avail: a digital status of a FIFO from set 211 indicating that the buffer is not being read at the given time, that it has one or more packets available for reading and that its fill level is at or above a monitoring threshold configured for these buffers.

lo_fill_avail: a digital status of a FIFO from set 211 indicating that the buffer is not being read at the given time, that it has one or more packets available for reading and that its fill level is below a monitoring threshold configured for these buffers.

nr_hi_fill_available_fifos_before: for a given FIFO of set 211, the number of buffers with lower ID#s than the given buffer that have their hi_fill_avail in active state.

nr_lo_fill_available_fifos_before: for a given FIFO of set 211, the number of buffers with lower ID#s than the given buffer that have their lo_fill_avail in active state.

available FIFO: a FIFO of set 211 with either its lo_fill_avail or hi_fill_avail in active state.

Hardware logic at multiplexing system 50, at the packet boundary occurrences of each of its output port 260 specific muxes 250, selects the next FIFOs form the set 211 for such trial_on muxes 250 to read, at least in part of indications 225 from the buffer set 211 comprising the balancer output port FIFO specific indications listed above. The prioritization and selection of the individual balancer output port specific packet FIFOs for reading on the output ports 260 of the multiplexer 50 operates as follows in our studied embodiment: In case, at a given time, there are H hi_fill_available FIFOs, L lo_fill_available FIFOs, and K lower ID# trial_on multiplexers than a given mux 250, the FIFO for that given mux 250 to read its next packet is:

if K<H, the hi_fill_available FIFO at which nr_hi_fill_available_fifos_before=K;
else, the available FIFO, at which nr_lo_fill_available_fifos_before=K−H, i.e., at which H+nr_lo_fill_available_fifos_before=K.

Once the next FIFO thus is selected for each mux 250, it will transfer the next packet to read from that FIFO via its output port 260 to the processing system 2 to which the PS output 60, of which that port 260 is part of, connects to.

In certain embodiments of the invented load balancing architecture, there are more than the two levels of balancers (i.e. the system-wide balancers 20 and the processor-wide balancers 70) presented in FIG. 1. For such embodiments, what is in FIG. 1 presented as a processing system 2, can comprise another system per FIG. 1, i.e., in such scenarios such hierarchical processing systems 2 comprise their internal system-wide balancers 20, PS 50 and the eventual processing systems 2. Naturally, this architecture can scale for any number of such hierarchical layers. As well, in certain embodiments of the invention, there is just one processing system 2 and accordingly just that processor-specific load balancer 70, with no PS 50 or load balancers 70. Moreover, various embodiments can have various combinations of arrangements per above.

According to some embodiments of the invention, the processing systems 1 as discussed herein are per the application load adaptive manycore processing systems described in the referenced patent applications [1] through [11]. In a given embodiment, a processing system 1 is per the multi-stage manycore processing system of the referenced application [7], which processing system in that application is also referenced with its reference character 1.

According to embodiments of the invention, the load balancing systems and methods as described above are implemented by hardware logic, such that operates without software involvement, at least other than the configuring of the device registers by the application instances indicating that they are available for NIS packets i.e. packets destined for their application that have no destination instance specified.

In conclusion, the load balancing systems and methods per the foregoing enable handing, with direct hardware logic based minimal and deterministic decision cycle latencies, high volumes of load balancing decisions, including when having to support large numbers of parallelized and/or pipelined hosted application programs and instances thereof on dynamically shared large parallel processing arrays, where the application processing loads can comprise high and unpredictable volumes of short lived transactions, and where, e.g. due to pipelined nature of the hosted applications, the availability status of any given application instance (in particular, the entry-stage task of its pipelined processing architecture) can change with high frequency.

Generally, this description and drawings are included to illustrate architecture and operation of practical embodiments of the invention, but are not meant to limit the scope of the invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the invention. Moreover, the system elements and process steps, though shown as distinct to clarify the illustration and the description, can in various embodiments be merged or combined with other elements, or further subdivided and rearranged, etc., without departing from the spirit and scope of the invention. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A hardware logic system for directing incoming processing data units, with such units referred to as packets, to instances of a set of locally hosted application programs referred to as the applications, the system including:

at any given one of a set of processing systems, each of which hosts its assigned groups of instances of the applications, a hardware logic subsystem for producing, for each given one of the applications, (1) an expression of availability of instances hosted at the given processing system that are accepting packets with no destination instance specified, with such packets referred to as no-instance-specified NIS packets, and (2) an indication of which instances of the given application are accepting NIS packets; and at an inter-processing-system load balancer among a set of such load balancers, a hardware logic subsystem for: examining whether an incoming packet destined for a given one of the applications has a destination instance of that given application identified, and if so, directing the packet toward a processing system that hosts such an identified destination instance, while otherwise, selecting an appropriate processing system to which to forward the packet, at least in part based on the expressions, from individual processing systems of said set, of availability of instances for the given application for NIS packets, and directing the packet to a such selected processing system; and at a second-stage load balancer specific to the processing system to which the packet was directed to by the inter-processing-system load balancer, a hardware logic subsystem for examining whether the packet has an instance of its destination application identified, and if so, directing the packet toward a processing resource associated with such an identified destination instance, while otherwise, determining an appropriate instance of said destination application among the group of instances of that application hosted on the processing system, at least in part based on said indication of which instances of said destination application are accepting NIS packets, and directing the packet toward a processing resource associated with such determined instance of that application.

2. The system of claim 1, wherein the expressions of availability of instances for the given application are based at least in part on one or more of the following numbers per each given one of the processing systems: 1) a number of available instances of the destination application for a given NIS packet hosted on the given processing system, referred to as an X number, and 2) a sum of available instances, within an entitlement quota of concurrently executing instances of each given application among the set, across the set of applications hosted on the given processing system, referred to as an Y number.

3. The system of claim 2, wherein among a group of the processing systems tied for a greatest X number, the hardware logic subsystem at the load balancer selects the processing system that has a greatest Y number as the processing system to which to direct the given NIS packet.

4. The system of claim 2, wherein among a group of the processing systems tied for a greatest Y number, the hardware logic subsystem at the load balancer selects the processing system that has a greatest X number as the processing system to which to direct the given NIS packet.

5. The system of claim 2, wherein the hardware logic subsystem at the load balancer forwards a given incoming NIS packet to such a processing system, among said set, that has a highest weighted sum of its number X and number Y, wherein each of the numbers X and Y for said weighted sum have their independently set positive values of their weighting coefficients.

6. The system of claim 2, wherein:

each of the processing systems among said set is numbered with its unique identification number (ID) so that such IDs form a sequence of integer numbers, each of the load balancers among said set is configured with its own constant ID value for its starting processing systems, with such constant ID value for the starting processing system for a given load balancer referred as its starting ID value, so that such starting ID values for the set of load balancers are at even intervals, and in cases of an equality among at least one of the numbers X, Y, or a weighted sum of X and Y by a group of the processing systems, the hardware logic subsystem at each given load balancer among the set selects the processing system with its ID closest to the starting ID value configured for the given load balancer, with such closeness measured as a number of increments of the ID needed from said starting ID value to reach an ID of a given candidate processing system, such that when incrementing the ID, upon reaching a maximum of such ID values, the incrementing continues from 0.

7. The system of claim 1, wherein:

a processing system of said set has multiple input ports, with an array of multiplexers comprising, for each such input port, a multiplexer multiplexing packets from a group of buffers storing input packets forwarded to the processing system through a group of output ports of the set of inter-processing-system load balancers;

each given multiplexer of the array enters into a trial-on mode of selecting its next one of the buffers to read a new packet from upon reaching the end of a packet it transfers to the processing system via the input port of the processing system associated with the given multiplexer;

each of the ports, multiplexers and buffers are identifiable with their unique IDs numbered from 0 upwards within their respective sets; and in case there are, at a given time:

H high-fill-available buffers in the group, such that are not being read at the given time, that have one or more packets available for reading and that have their fill levels at or above a monitoring threshold configured for these buffers;

L low-fill-available buffers in the group, such that are not being read at the given time, that have one or more packets available for reading and that have their fill levels below a monitoring threshold configured for these buffers;

and K lower ID multiplexers in the trial-on mode than a given multiplexer of the array, wherein K, L and H are non-negative numbers, the buffer from said group for that given multiplexer to read its next packet from is:

if K is less than H, that high-fill-available buffer, whose count of high-fill-available buffers with lower ID than that buffer equals K; and else, that high-fill-available or low-fill-available buffer whose count of low-fill-available buffers with lower ID than that buffer equals K minus H.

8. A hardware logic implemented method for directing incoming processing data units, with such units referred to as packets, to instances of a set of locally hosted application programs referred to as the applications, the method involving:

at any given one of a set of hardware processing systems, each of which hosts its assigned groups of instances of the applications, producing, for each given one of the applications, (1) an expression of availability of instances hosted at the given processing system that are accepting packets with no destination instance specified, with such packets referred to as no-instance-specified (NIS) packets, and (2) an indication of which instances of the given application are accepting NIS; and by an inter-processing-system load balancer among a set of such load balancers, in case an incoming packet destined for a given one of the applications does not have a destination instance of that given application identified, selecting an appropriate processing system to which to direct the packet, at least in part based on the expressions, from individual processing systems of said set, of availability of instances for the given application for NIS packets, and directing the packet to a such selected processing system; and at a second-stage load balancer specific to the processing system to which the packet was directed to by the inter-processing-system load balancer, in case an incoming packet destined for a given one of the applications is a NIS packet, determining an appropriate instance of said destination application among the group of instances of that application hosted on the processing system to which to forward the NIS packet, at least in part based on said indication of which instances of said destination application are accepting NIS packets.

9. The method of claim 8, wherein the expressions of availability of instances for the given application are based at least in part on one or more of the following numbers per each given one of the processing systems: 1) a number of available instances of the destination application for a given NIS packet hosted on the given processing system, referred to as an X number, and 2) a sum of available instances, within an entitlement quota of concurrently executing instances of each given application among the set, across the set of applications hosted on the given processing system, referred to as an Y number.

10. The method of claim 9, wherein among a group of the processing systems tied for a greatest X number, the load balancer selects the processing system that has a greatest Y number as the processing system to which to direct the given NIS packet.

11. The method of claim 9, wherein among a group of the processing systems tied for a greatest Y number, the load balancer selects the processing system that has a greatest X number as the processing system to which to direct the given NIS packet.

12. The method of claim 9, wherein the load balancer forwards a given incoming NIS packet to such a processing system, among said set, that has a highest weighted sum of its number X and number Y, wherein each of the numbers X and Y for said weighted sum have their independently set positive values of their weighting coefficients.

13. The method of claim 9, wherein:
each of the processing systems among said set is numbered with its unique identification number (ID) so that such IDs form a sequence of integer numbers,
each of the load balancers among said set is configured with its own constant ID value for its starting processing system, with such constant ID value for the starting processing system for a given load balancer referred as its starting ID value, so that such starting ID values for the set of load balancers are at even intervals, and in cases of an equality among at least one of the numbers X, Y, or a weighted sum of X and Y by a group of the processing systems, the hardware logic subsystem at each given load balancer among the set selects the processing system with its ID closest to the starting ID value configured for the given load balancer, with such closeness measured as a number of increments of the ID needed from said starting ID value to reach an ID of a given candidate processing system, such that when incrementing the ID, upon reaching a maximum of such ID values, the incrementing continues from 0.

14. The method of claim 8, wherein:
a processing system of said set has multiple input ports, with an array of multiplexers comprising, for each such input port, a multiplexer multiplexing packets from a group of buffers storing input packets forwarded to the processing system through a group of output ports of the set of inter-processing-system load balancers;
each given multiplexer of the array enters into a trial-on mode of selecting its next one of the buffers to read a new packet from upon reaching the end of a packet it transfers to the processing system via the input port of the processing system associated with the given multiplexer;
each of the ports, multiplexers and buffers are identifiable with their unique IDs numbered from 0 upwards within their respective sets; and
in case there are, at a given time:
H high-fill-available buffers in the group, such that are not being read at the given time, that have one or more packets available for reading and that have their fill levels at or above a monitoring threshold configured for these buffers;
L low-fill-available buffers in the group, such that are not being read at the given time, that have one or more packets available for reading and that have their fill levels below a monitoring threshold configured for these buffers;
and K lower ID multiplexers in the trial-on mode than a given multiplexer of the array, wherein K, L and H are non-negative numbers, the buffer from said group for that given multiplexer to read its next packet from is:
if K is less than H, that high-fill-available buffer, whose count of high-fill-available buffers with lower ID than that buffer equals K; and
else, that high-fill-available or low-fill-available buffer whose count of low-fill-available buffers with lower ID than that buffer equals K minus H.

15. A hardware logic system for directing incoming processing data units, with such units referred to as packets, to instances of a locally hosted application program referred to as the application, the system including:
at any given one of a set of processing systems, each of which hosts its assigned group of instances of the application, a hardware logic subsystem for producing an expression of which instances among said group are accepting packets that have no destination instance specified, with such packets referred to as no-instance-specified (NIS) packets and with such instances accepting NIS packets referred to as available instances; and
at a processing system specific load balancer of a processing system to which the packet was directed to by an inter-processing-system load balancer, a hardware logic subsystem for: examining whether the packet has its destination instance identified, and if so, directing the packet toward a processing resource associated with such an identified destination instance, while otherwise, selecting an appropriate instance among the group of instances of the application hosted on the processing system, at least in part based on said expression of which instances among said group are accepting NIS packets, and directing the packet toward a processing resource associated with such selected instance of the application, wherein:

the load balancer has multiple input ports, with an array of multiplexers comprising for each such input port a multiplexer multiplexing packets from a group of buffers storing input packets to the processing system;

each given multiplexer of the array enters into a trial-on mode of selecting its next one of the buffers to read a new packet from upon reaching the end of a packet it transfers to the load balancer via the input port of the balancer associated with the given multiplexer;

each of the ports, multiplexers and buffers are identifiable with their unique IDs numbered from 0 upwards within their respective sets; and in case there are, at a given time:

H high-fill-available buffers in the group, such that are not being read at the given time, that have one or more packets available for reading and that have their fill levels at or above a monitoring threshold configured for these buffers;

L low-fill-available buffers in the group, such that are not being read at the given time, that have one or more packets available for reading and that have their fill levels below a monitoring threshold configured for these buffers;

and K lower ID multiplexers in the trial-on mode than a given multiplexer of the array, wherein K, L and H are non-negative numbers, the buffer from said group for that given multiplexer of said array to read its next packet from is:

if K is less than H, that high-fill-available buffer, whose count of high-fill-available buffers with lower ID than that buffer equals K; and else, that high-fill-available or low-fill-available buffer whose count of low-fill-available buffers with lower ID than that buffer equals K minus H.

16. The system of claim 15, wherein the processing resource is one of: a digital data buffer, or a piece of data processing logic such as a processing core, which, in turn, is one of: a central processing unit, a graphics processing unit, a digital signal processor, or an application specific processor.

17. The system of claim 15, further involving:

at any given one of the set of processing systems, hardware logic for expressing a number of the available instances at the given processing system; and at the inter-processing-system load balancer, hardware logic for: examining whether an incoming packet destined for the application has a destination instance identified, and if so, directing the packet toward a processing system that hosts such identified destination instance, while otherwise, determining an appropriate processing system to which to forward the packet, at least in part based on said numbers of the available instances from individual processing systems of said set, and directing the packet to a such determined processing system.

18. A hardware logic implemented method for directing incoming processing data units, with such units referred to as packets, to instances of a locally hosted application program referred to as the application, the method involving:

at any given one of a set of processing systems, each of which hosts its assigned group of instances of the application, producing an expression of which instances among said group are accepting packets with no destination instance specified, with such packets referred to as no-instance-specified (NIS) packets and with such instances accepting NIS packets referred to as available instances; and at a processing system specific load balancer of a processing system of said set, in case of an incoming NIS packet, selecting an appropriate instance among the group of instances of the application hosted on the processing system to which to direct the packet, at least in part based on said expression of which instances among said group are accepting NIS packets, wherein:

the load balancer has multiple input ports, with an array of multiplexers comprising for each such input port a multiplexer multiplexing packets from a group of buffers storing input packets to the processing system;

each given multiplexer of the array enters into a trial-on mode of selecting its next one of the buffers to read a new packet from upon reaching the end of a packet it transfers to the load balancer via the input port of the balancer associated with the given multiplexer;

each of the ports, multiplexers and buffers are identifiable with their unique IDs numbered from 0 upwards within their respective sets; and in case there are, at a given time:

H high-fill-available buffers in the group, such that are not being read at the given time, that have one or more packets available for reading and that have their fill levels at or above a monitoring threshold configured for these buffers;

L low-fill-available buffers in the group, such that are not being read at the given time, that have one or more packets available for reading and that have their fill levels below a monitoring threshold configured for these buffers;

and K lower ID multiplexers in the trial-on mode than a given multiplexer of the array, wherein K, L and H are non-negative numbers, the buffer from said group for that given multiplexer to read its next packet from is:

if K is less than H, that high-fill-available buffer, whose count of high-fill-available buffers with lower ID than that buffer equals K; and else, that high-fill-available or low-fill-available buffer whose count of low-fill-available buffers with lower ID than that buffer equals K minus H.

19. The method of claim 18, further involving:

at any given one of the set of processing systems, expressing a number of the available instances at the given processing system; and at an inter-processing-system load balancer, in case an incoming NIS packet, determining an appropriate processing system to which to direct the packet, at least in part based on said numbers of the available instances from individual processing systems of said set.

* * * * *